(12) United States Patent
Lee

(10) Patent No.: US 9,732,397 B2
(45) Date of Patent: Aug. 15, 2017

(54) DEFECTIVE ENGINE BLOCK RECYCLING METHOD IN CONTINUOUS CASTING LINE

(71) Applicant: AJU STEEL CO., LTD, Gyeongsangbuk-do (KR)

(72) Inventor: Hak Yeon Lee, Gyeongsangbuk-do (KR)

(73) Assignee: AJU STEEL CO., LTD., Gyeongsangbuk-do (KR)

( * ) Notice: Subject to any disclaimer, the term of this patent is extended or adjusted under 35 U.S.C. 154(b) by 0 days.

(21) Appl. No.: 14/830,370

(22) Filed: Aug. 19, 2015

(65) Prior Publication Data

US 2016/0354837 A1 Dec. 8, 2016

(30) Foreign Application Priority Data

Jun. 5, 2015 (KR) ........................ 10-2015-0080015

(51) Int. Cl.
*B22D 19/00* (2006.01)
*C22B 7/00* (2006.01)

(52) U.S. Cl.
CPC .......... *C22B 7/003* (2013.01); *B22D 19/0009* (2013.01); *Y02P 10/218* (2015.11)

(58) Field of Classification Search
CPC B22D 19/00; B22D 19/0009; B22D 19/0027; B22D 19/009; B22D 19/02; B22D 45/00
See application file for complete search history.

(56) References Cited

U.S. PATENT DOCUMENTS

2006/0108089 A1* 5/2006 Yoshihara .......... B22D 19/0009
164/98

FOREIGN PATENT DOCUMENTS

KR 100625109 9/2006
KR 1020060131064 12/2006

OTHER PUBLICATIONS

Merriam-Webster definition of if, https://www.merriam-webster.com/dictionary/if, accessed Dec. 9, 2016.*

* cited by examiner

*Primary Examiner* — Kevin P Kerns
*Assistant Examiner* — Steven Ha
(74) *Attorney, Agent, or Firm* — IP & T Group LLP

(57) ABSTRACT

A defective engine block recycling method in a continuous casting line includes inserting a bore pin into an engine block mold, fitting a real liner to an outer circumferential surface of the bore pin, and injecting molten aluminum into the engine block mold to cast an engine block body. If an abnormality is generated in the engine block mold or the molten aluminum and if a defect is expected to generate in the engine block body, a defective engine block unit is produced by fitting a dummy liner, which is made of a material identical with or similar to a material of the engine block body, to the bore pin. The defective engine block unit thus produced is directly melted and recycled.

4 Claims, 5 Drawing Sheets

DEFECTIVE ENGINE BLOCK RECYCLING METHOD IN CONTINUOUS CASTING LINE

CROSS-REFERENCE TO RELATED APPLICATION

The present application claims priority to Korean patent application number 10-2015-0080015, filed on Jun. 5, 2015, the entire disclosure of which is herein incorporated by reference in its entirety.

TECHNICAL FIELD

The present invention relates to a defective engine block recycling method in a continuous casting line. More particularly, the present invention pertains to a defective engine block recycling method in a continuous casting line in which, if a defect is expected to generate in a process of continuously casting engine blocks for use in motor vehicles, ships, aircrafts and the like, an engine block is cast using an aluminum-made dummy liner instead of a cast iron liner. The defective engine block thus manufactured is immediately recycled into an aluminum ingot. This eliminates the need to perform a work of removing a cast iron liner from an aluminum engine block, thereby reducing the cost and improving the quality of a recycled aluminum ingot.

BACKGROUND ART

In recent years, engine blocks for use in motor vehicles, ships, air crafts and the like are often manufactured using lightweight aluminum instead of cast iron. As compared with a cast-iron engine block, an aluminum engine block is high-priced but is advantageous in that it is possible to significantly reduce the weight of the engine block.

However, due to the intrinsic properties thereof, aluminum is hardly used as a cylinder liner on which a high temperature and a high pressure act. Accordingly, even if an engine block is made of aluminum, a cast iron liner exhibiting a superior wear resistance is used as a cylinder liner. Thus, a cylindrical cast iron liner is fixed to an engine block mold and, then, molten aluminum is poured into the engine block mold, thereby integrating an aluminum engine block and a cast iron liner.

An aluminum engine block is usually manufactured by a die casting method. The die casting method is a casting method used in casting nonferrous metal. In the die casting method, molten metal is injected into a die at a pressure equal to or higher than the atmosphere pressure and is continuously pressed by a plunger until the molten metal is completely solidified.

The die casting method has been used in casting metal types. Along with the development of nonferrous metal having high, strength, the range of application of the die casting method is gradually widened.

A mold employed in the die casting method suddenly makes contact with a high-temperature molten metal. Thus, corrosions or cracks are easily generated on the surface of the mold. For that reason, special steel having a high heat resistance is primarily used in making a die-casting-purpose mold.

In order to perform a die casting process, it is necessary to use a die casting machine for pressurizing and injecting molten metal. The die casting machine is designed to inject molten metal into a mold at a high pressure and a high speed using a compressed air or a hydraulic plunger.

For the reasons stated above, the die casting method is more costly than an ordinary casting method and is not suitable for production of a small number of articles. The die casting method is economical only when mass-producing the same kind of products.

Depending on the method of injecting molten metal, die casting machines may be classified into a hot-chamber-type die casting machine and a cold-chamber-type die casting machine.

In the hot-chamber-type die casting machine, a pressurizing cylinder is disposed within a melting pot. A plunger is moved into the pressurizing cylinder by a pneumatic pressure, a hydraulic pressure or an oil pressure, thereby pushing molten metal into a mold. Aluminum engine blocks are primarily manufactured by the hot-chamber-type die casting machine. In the hot-chamber-type die casting machine, there is a need to preheat an engine block mold prior to casting. During a casting process, a constant temperature (e.g., 250 to 300 degrees C.) should be maintained in order to minimize generation of detective products.

On the other hand, a melting furnace is independently provided in the cold-chamber-type die casting machine. Molten metal is taken out of the melting furnace and is put into a pressurizing chamber. The molten metal is pushed into a die by a plunger. That is to say, in the cold-chamber-type die casting machine, molten metal is put into a sleeve made of special steel. By moving a piston rod, molten metal is injected into a die with a plunger mounted to the front end of the piston rod.

As compared with the hot-chamber-type die casting machine, the cold-chamber-type die casting machine has an advantage in that impurities are less likely to infiltrate into the molten metal and a dense structure can be obtained by applying a high pressure at an initial cooling stage and during a solidifying period.

Depending on the method of moving a die, die casting machines may be divided into a vertical die casting machine and a horizontal die casting machine.

In the vertical die casting machine, a movable die is vertically disposed on a fixed die. In the horizontal die casting machine, a fixed die and a movable die are horizontally disposed. While the vertical die casting machine has been extensively used in the past, the horizontal die casting machine is predominantly used in recent years.

FIGS. 1 and 2 illustrate one example of an aluminum engine block 10 manufactured by the aforementioned die casting method. As illustrated in FIGS. 1 and 2, the aluminum engine block 10 includes a body made of aluminum and a cast iron liner 20 having a superior wear resistance. In FIG. 2, reference numeral 30 designates a water jacket for cooling an engine.

A process of manufacturing a conventional aluminum engine block will now be described with reference to FIGS. 3 and 4.

An aluminum engine block 10 is automatically manufactured by a die casting machine in an ordinary continuous casting line. As illustrated in FIG. 3A, an engine block mold M is mounted to a die. Thereafter, as illustrated in FIG. 3B, a bore pin 40 is fitted to the engine block mold M. The bore pin 40, which serves as a core during a casting process, is configured to support a cast iron liner 20 when pressurizing molten aluminum.

Then, as illustrated in FIG. 3O, the cast iron liner 20 is fitted to the outer circumferential surface of the bore pin 40 using a robot arm 50. The cast iron liner 20 is formed in a cylindrical shape so as to have a predetermined thickness. After the casting process, the inner circumferential surface of the cast iron liner 20 is machined. A plurality of cast iron liners 20 is disposed side by side along a casting line. In the case where an engine block is of a four-cylinder type, the robot arm 50 picks up four cast iron liners 20 and fits the cast iron liners 20 to the outer circumferential surfaces of bore pins 40.

Then, if molten aluminum is pressurized in the state illustrated in FIG. 3D, the molten aluminum is brought into contact with the outer circumferential surface of the cast iron liner 20 and is solidified.

If an engine block product is taken out by moving the mold M after the molten aluminum is solidified, it is possible to obtain an engine block in which a cylindrical cast iron liner is integrally formed with an aluminum body.

However, in the conventional aluminum engine block manufacturing method described above, defects are often generated in a boundary region between the cast iron liner 20 and the aluminum engine block 10. Since cast iron and aluminum differ in physical and chemical properties such as a melting point or the like from each other, it is difficult for cast iron and aluminum to be completely fused in a boundary region thereof. Thus, casting defects are frequently generated in the boundary region.

The defective engine block is discarded or recycled. In the case of discarding the defective engine block, a loss of material cost grows larger. In the case of recycling the defective engine block, a large amount of cost is incurred in the recycling process.

If it is possible to easily remove the cast iron liner 20 from the defective engine block 10, no problem will be posed in recycling the defective engine block 10 into an aluminum ingot. However, it is not easy to remove the cast iron liner 20 integrally formed with the engine block 10.

If the defective engine block is melted and recycled into an aluminum ingot without completely removing a cast iron component, the quality of the aluminum ingot is reduced due to the cast iron component remaining in the aluminum ingot. In order to solve this problem, it is thinkable to remove a cast iron component from molten aluminum. In this case, however, a large amount of cost is incurred.

As a solution to the aforementioned, problem, Korean Patent Application Publication No. 10-2006-0131064 discloses a method of detaching and recovering a cylinder liner from a cylinder block. In this method, a cylinder block for an automotive engine to be recycled is loaded onto a conveyer. Then, the inner surface of a cylinder liner is heated by flames or induction heating. Particularly, a boundary region between an aluminum body and a cylinder liner of the cylinder block is heated to a temperature equal to or higher than a melting point of the aluminum body, thereby removing the cylinder liner.

In the conventional method mentioned above, however, an additional heat source is needed, in order to heat the inner surface of the cylinder liner by flames or induction heating. This poses a drawback in that a recycling apparatus becomes complex. Furthermore, it is difficult to completely remove a cast iron component even if the cylinder liner is heated and melted.

Korean Patent No. 10-0625109 discloses an apparatus and method of removing a liner from an aluminum cylinder block. In this prior art, a defective product generated in a cylinder block manufacturing process is recycled into a raw material for the production of a cylinder block without going through an additional smelting process.

To this end, the apparatus for manufacturing a cylinder block including a cylinder body made of aluminum and a liner made of another metallic material and fixed to the inner surface of the cylinder body includes a bed, a movable base installed so as to reciprocate toward and away the bed, a fixing means for fixing a detective cylinder block to one of the bed and the movable base, a cutting tool mounted to the other of the bed and the movable base at the opposite side of the cylinder block in a position corresponding to the cylinder of the cylinder block, the cutting tool having a cutting diameter larger than the outer diameter of the liner, a rotating means for rotating the cutting tool, and a moving means for moving the movable bas toward the bed so that the liner of the cylinder block and the peripheral portion thereof are cut by the cutting tool.

The apparatus of the prior art cited above is designed to remove the cylinder liner through a cutting work in the case where defects are generated in the cylinder block. However, the apparatus of the prior art is extremely complex due to the provision of the additional cutting tool. In addition, there is a limit in removing the cylinder liner through the cutting work.

SUMMARY OF THE INVENTION

In view of the aforementioned problems inherent in the prior art, it is an object of the present invention to provide a defective engine block recycling method in a continuous casting line, which is capable of easily recycling a defective engine block unit in a cost-effective manner and minimizing a loss of material cost attributable to generation of a defect.

Another object of the present invention is to provide a defective engine block recycling method in a continuous casting line, which is capable of easily recycling a defective engine block unit without resort to an additional recycling facility or work and significantly reducing a recycling cost.

A further object of the present invention, is to provide a defective engine block recycling method in a continuous casting line, which is capable of preventing stoppage of an operation of the continuous casting line by, if a defect is expected to generate in an engine block body, mounting a dummy liner rather than a real liner to a mold so that a casing process is continuously performed without stoppage.

A still further object of the present invention is to provide a defective engine block recycling method in a continuous casting line, which is capable of directly melting and recycling a defective engine block unit without going through an additional work by using a dummy liner made of a material identical with or similar to a material of an engine block body.

A yet still further object of the present invention is to provide a defective engine block recycling method in a continuous casting line, which is capable of reliably preventing inclusion of a cast iron component in a defective engine block unit, thereby preventing deterioration of physical properties of a recycled aluminum ingot otherwise caused by the mixture of impurities and improving the quality of a recycled aluminum ingot.

In order to achieve the above objects, there is provided a defective engine block recycling method in a continuous casting line, including: inserting a bore pin into an engine block mold; fitting a real liner to an outer circumferential surface of the bore pin; and injecting molten aluminum into the engine block mold to cast an engine block body, wherein if an abnormality is generated in the engine block mold or the molten aluminum and if a defect is expected to generate in the engine block body, a defective engine block unit is produced by fitting a dummy liner, which is made of a material identical with or similar to a material of the engine block body, to the bore pin, and the defective engine block unit thus produced is directly melted and recycled.

In the method mentioned above, the engine block body may be made of aluminum, the real liner may be made of cast iron, and the dummy liner may be made of a material which does not affect a quality of an aluminum ingot obtained by melting the defective engine block unit.

In the method mentioned above, the dummy liner may be melted and recycled without going through a process of removing the dummy liner from the defective engine block unit.

In the method mentioned above, the dummy liner may have a diameter which grows larger upward.

In the method mentioned, above, the dummy liner may be formed by expanding or contracting an aluminum pipe.

In the method mentioned above, the defective engine block unit may be produced by a die casting machine.

In the method mentioned above, the die casting machine may include a temperature sensor configured to detect a temperature of the engine block mold and an alarming device configured to issue an alarm when the temperature of the engine block mold falls outside a predetermined temperature range.

According to the present invention, it is possible to provide a defective engine block recycling method in a continuous casting line, which is capable of easily recycling a defective engine block unit in a cost-effective manner and minimizing a loss of material cost attributable to generation of a defect.

It is also possible to provide a defective engine block recycling method in a continuous casting line, which is capable of easily recycling a defective engine block unit without resort to an additional recycling facility or work and significantly reducing a recycling cost.

It is also possible to provide a defective engine block recycling method in a continuous casting line, which is capable of preventing stoppage of an operation of the continuous casting line by, if a defect is expected to generate in an engine block, mounting a dummy liner rather than a real liner to a mold so that a casing process is continuously performed without stoppage. This makes it possible to prevent reduction of productivity otherwise caused by generation of a defective product.

It is also possible to provide a defective engine block recycling method in a continuous casting line, which is capable of directly melting and recycling a defective engine block unit without going through an additional work by using a dummy liner made of a material identical with or similar to a material of an engine block body.

It is also possible to provide a defective engine block recycling method in a continuous casting line, which is capable of reliably preventing inclusion of a cast iron component in a defective engine block unit, thereby preventing deterioration of physical properties of a recycled aluminum ingot otherwise caused by the mixture of impurities and improving the quality of a recycled aluminum ingot.

BRIEF DESCRIPTION OF THE DRAWINGS

The above and other objects and features of the present invention will become apparent from the following description of preferred embodiments, given in conjunction with the accompanying drawings.

DETAILED DESCRIPTION OF THE PREFERRED EMBODIMENTS

Figure 1:
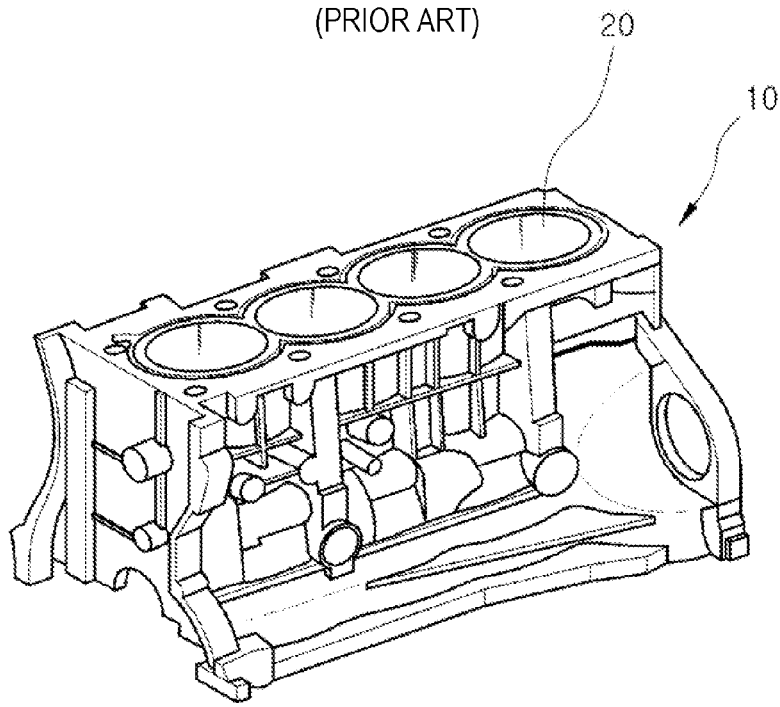
FIG. 1 is a perspective view of an aluminum engine block manufactured by the prior art.
Figure 2:
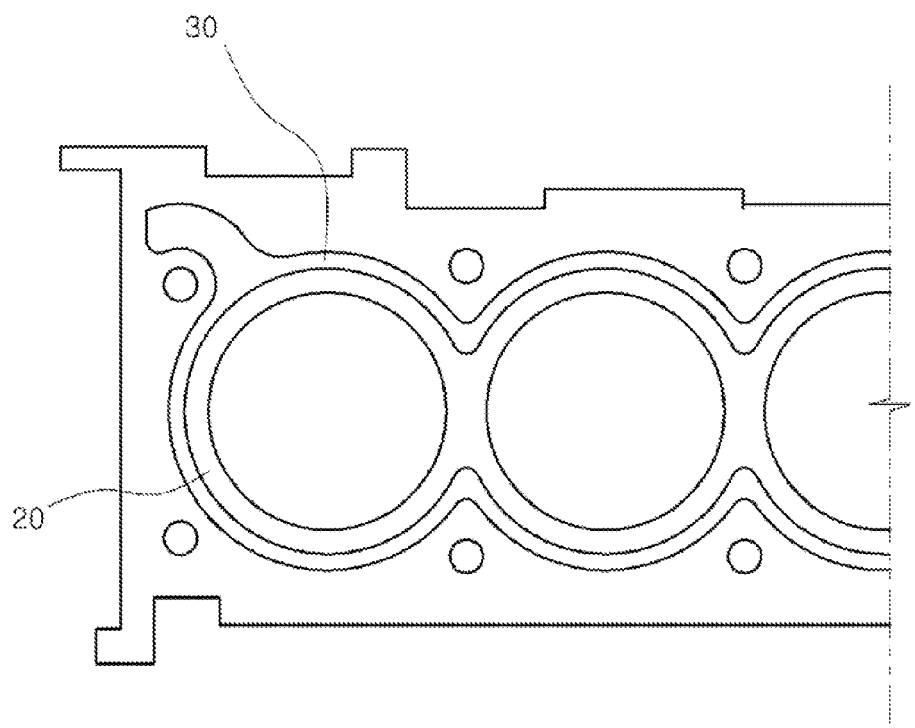
FIG. 2 is a plan view of the aluminum, engine block illustrated in FIG. 1.
Figure 3:
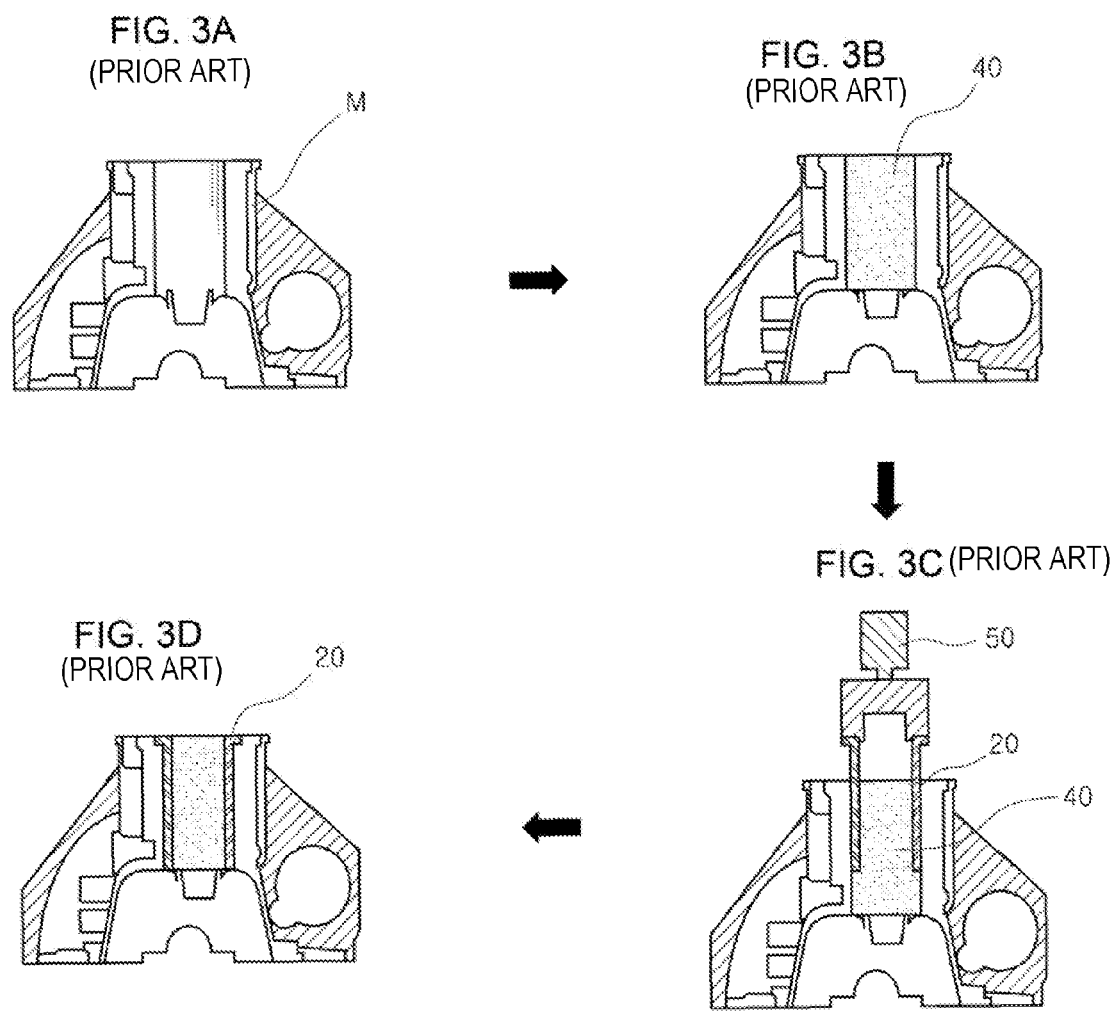
FIGS. 3A to 3D are sectional views illustrating how to mount a cast iron liner to a mold in the prior art.
Figure 4:
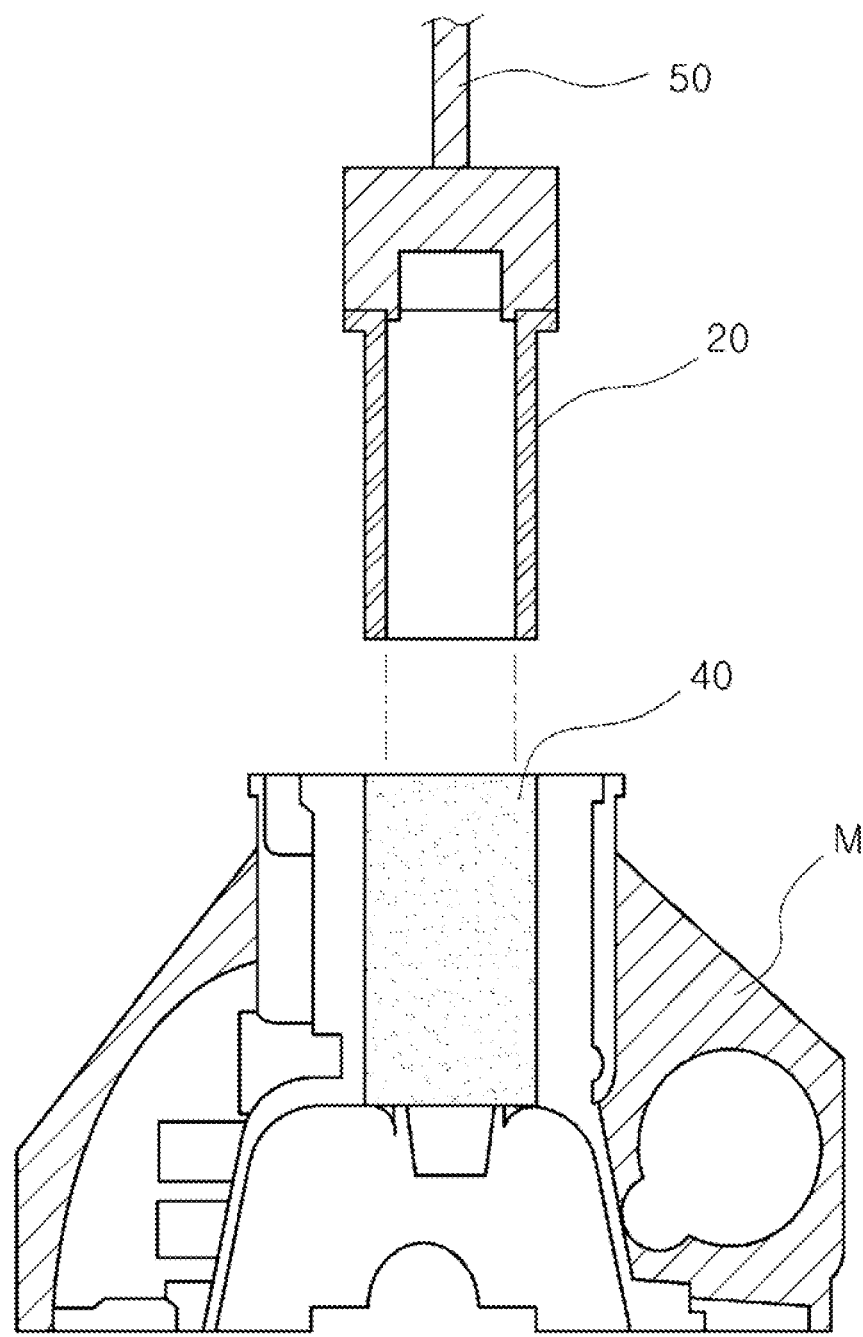
FIG. 4 is an enlarged sectional view illustrating how to fit a cast iron liner to a bore pin in the prior art.
Figure 5:
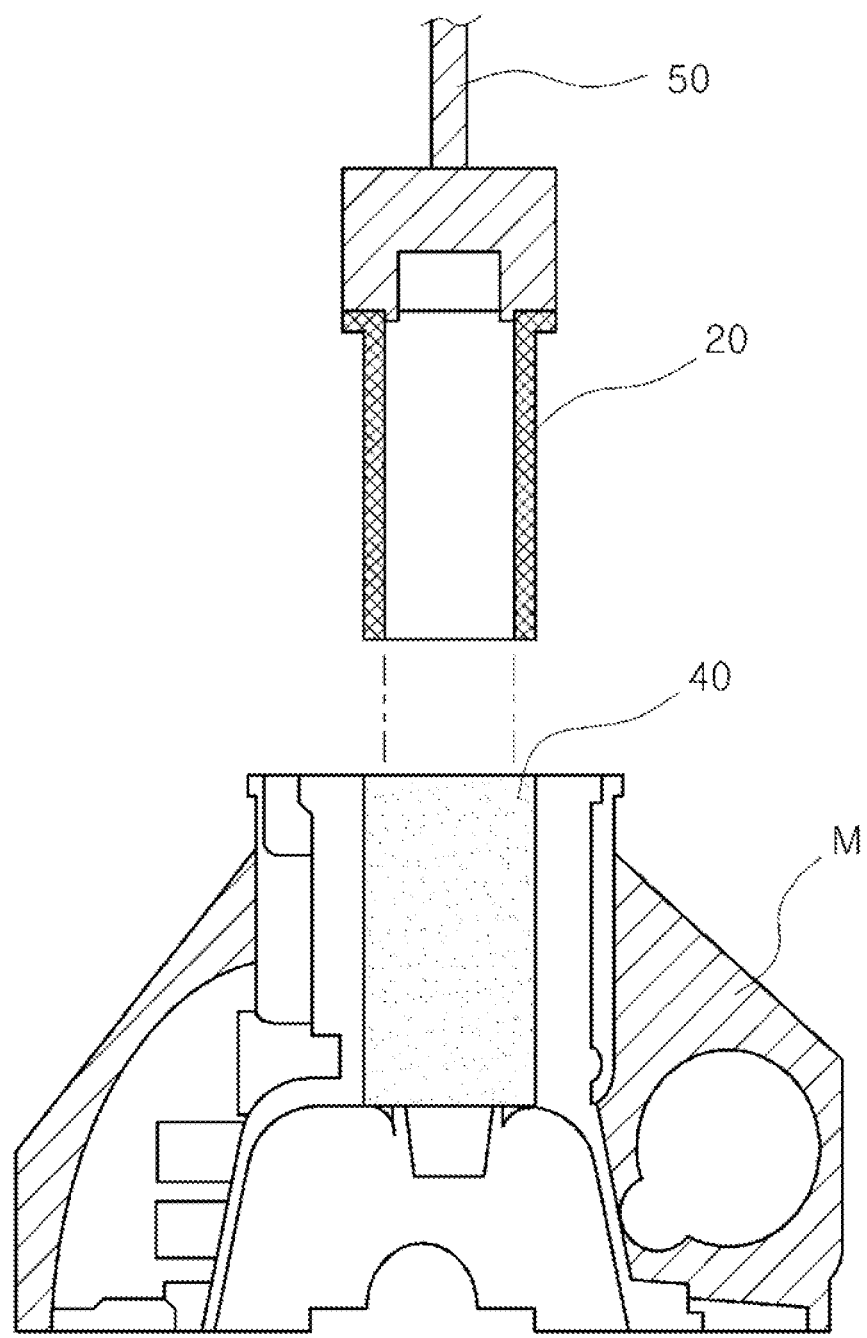
FIG. 5 is an enlarged sectional view illustrating how to fit a dummy liner to a bore pin according to the present invention.
Figure 6:
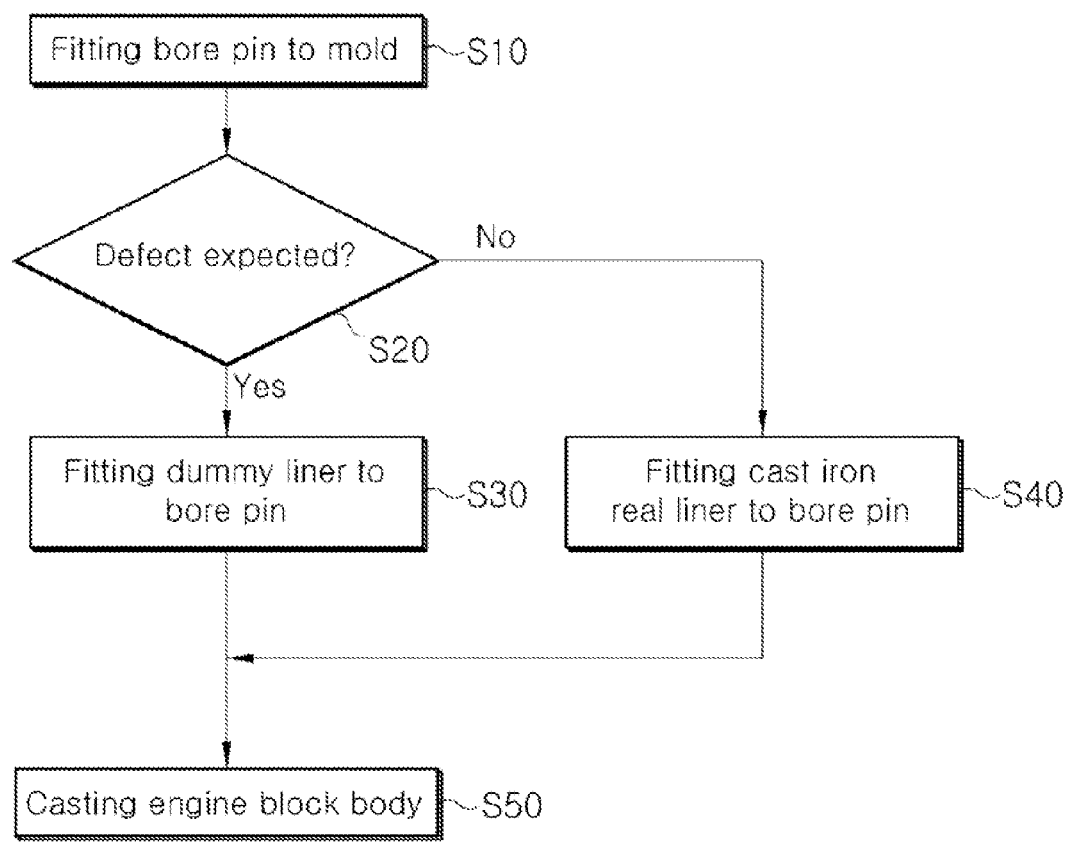
FIG. 6 is a flowchart illustrating a process of producing an engine block unit according to the present invention.

One preferred embodiment of a defective engine block recycling method in a continuous casting line according to the present invention will now be described with reference to FIGS. 5 and 6.

For the sake of convenience, descriptions will be made on a case where an engine block unit including an aluminum engine block body 10 and a cast iron liner 20 is produced by a die casting method.

Since the die casting method has been described in the background art, no duplicate description will be made thereon. The following descriptions will be centered on the features of the present invention.

A defective engine block recycling method in a continuous casting line according to the present invention includes; inserting a bore pin 40 into an engine block mold M; fitting a real liner 20 to an outer circumferential surface of the bore pin 40; and injecting molten aluminum into the engine block mold M to cast an engine block body 10.

If an abnormality is generated in the engine block mold M or the molten aluminum and if a defect is expected to generate in the engine block body 10, a defective engine block unit is produced by fitting a dummy liner 20a, which is made of a material identical with or similar to a material of the engine block body 10, to the bore pin 40, and the defective engine block unit thus produced is directly melted and recycled.

The dummy liner 20a is melted together with the defective engine block unit without removing the dummy liner 20a from the defective engine block unit and is recycled into an aluminum ingot.

The dummy liner 20a is not used as a real cylinder liner. In the case where a defect is expected to generate in the engine block body 10, the dummy liner 20a is used in place of the cast iron real liner 20 in order to avoid stoppage of an operation in a continuous casting line.

Conventionally, a defective engine block unit is recycled by breaking and removing a cast iron liner from an engine block body, or melting and removing a cast iron liner from an engine block body, or cutting and removing a cast iron liner from an engine block body using a cutting device. For that reason, a great deal of time and cost is required in recycling the defective engine block unit.

In the present invention, the dummy liner 20a is made of a material identical with or similar to a material of the engine block body 10, specifically a material which does not reduce the quality of an aluminum ingot obtained by melting a defective engine block unit. Thus, there is no need to stop a continuous casting line even when a defect is expected to generate in the engine block body 10.

It is preferred that the dummy liner 20a has a diameter which grows larger upward. The dummy liner 20a is preferably formed by expanding or contracting an aluminum pipe produced through an extruding process. However, the method of manufacturing the dummy liner 20a is not limited thereto.

The engine block body 10 is cast by a die casting machine (not illustrated). The die casting machine preferably includes a temperature sensor configured to detect a temperature of the engine block mold M and an alarming device configured to issue an alarm when the temperature of the engine block mold M fails outside a predetermined temperature range.

According to this configuration, if a defect is expected to generate in the engine block body 10, for example, if the temperature of the engine block mold M falls outside a predetermined temperature range or if the molten aluminum is determined to be poor, a worker may use the aluminum-made dummy liner 20a instead of the cast iron real liner 20.

Since the dummy liner 20a does not affect the quality of an aluminum ingot produced by melting the engine block unit, the defective engine block unit may be directly recycled by melting the dummy liner 20a together with the engine block body 10.

A process of manufacturing an engine block unit according to the present invention will now be described with reference to FIG. 6.

First, the engine block mold M is mounted to the die casting machine, and the bore pin 40 is inserted into the engine block mold M. The cast iron real liner 20 and the dummy liner 20a are disposed side by side on the continuous casting line. This enables a robot arm 50, which will be described later, to selectively pick up the cast iron real liner 20 or the dummy liner 20a and fit the same to the bore pin 40.

The bore pin 40 is a member which serves as a core in the casting process. The bore pin 40 is configured to support the cast iron liner 20 when injecting the molten aluminum into the engine block mold M.

Then, the robot arm 50 is operated so as to pick up the cast iron real liner 20 or the aluminum-made dummy liner 20a and fit the same to the bore pin 40. In the case where the engine block body 10 is of a four-cylinder type, the robot arm 50 picks up four cast iron liners 20 or four dummy liners 20a at a time and fits the same to the bore pin 40.

When automatically casting engine block units in a continuous casting line, a defect may be generated in a specific section. Particularly, if molten aluminum is injected toward a cast iron real liner, a casting defect is often generated in a boundary region between the molten aluminum and the cast iron real liner.

In order to cast an engine block unit with a high quality, it is necessary to preheat the engine block mold M to a predetermined temperature and to keep the temperature constant. In the case where a casting work is initially started or restarted after pause, the temperature of the engine block mold M may fail, outside a suitable temperature range. In this case, the temperature sensor (not illustrated) of the die casting machine detects the temperature of the engine block mold M which fails outside the suitable temperature range. Then, the alarming device notifies a worker of the situation by issuing an alarm. Furthermore, there may be a case where the state of molten aluminum is poor and a defect is expected to generate in the engine block body 10.

In these cases, the worker does not stop the continuous casting line but takes a measure so that the robot arm 50 picks up the dummy liner 20a in place of the cast iron real liner 20 and fits the dummy liner 20a to the bore pin 40 of the engine block mold M.

In other words, if the continuous casting line is normally operated, the east iron real liner 20 is fitted to the bore pin 40 of the engine block mold M. If an abnormality is detected in the continuous casting line, the dummy liner 20a is fitted to the bore pin 40 of the engine block mold M.

The dummy liner 20a is not used as a real cylinder liner because the dummy liner 20a made of aluminum is weak in wear resistance and is unsuitable for use as a real cylinder liner. The dummy liner 20a is used to manufacture a defective engine block unit without stopping the continuous casting line even in the case where a defect is expected to generate in the engine block body 10.

In the prior art, if a defect is generated in an engine block body 10 in a certain section of a continuous casting line, the operation of the continuous casting line is stopped to take a necessary measure. Thereafter, the operation of the continuous casting line is resumed. This leads to a problem in that the productivity in the continuous casting line is reduced.

In an effort to prevent reduction of the productivity, the continuous casting line may be continuously operated even when a defect is generated in an engine block body. In this case, however, there is manufactured a defective product in which a cast iron real liner is integrally formed with an aluminum engine block body. Thus, a great deal of time and cost is required in recycling the defective product. Furthermore, it is quite difficult to completely remove the cast iron real liner from the aluminum engine block. This may reduce the quality of a recycled aluminum ingot.

In contrast, according to the present invention, if an abnormality is generated in the engine block mold M or if a defect is expected to generate in the engine block body 10, the aluminum-made dummy liner 20a is used in place of the cast iron real liner 20. This makes it possible to continuously perform a casting work in the continuous casting line.

That is to say, there is no need to stop the operation of the continuous casting line. It is therefore possible to prevent reduction of productivity. Since the engine block body 10 and the dummy liner 20a are made of an identical or similar material, it is possible to directly melt the defective engine block unit and to recycle the defective engine block unit into an aluminum ingot.

Inasmuch as it is not necessary to perform a work of removing the cast iron real liner 20 from the aluminum-made engine block body 10, it is possible to significantly reduce the cost required in recycling the defective engine block unit.

In addition, since the engine block body 10 and the dummy liner 20a are made of an identical or similar material, it is possible to prevent deterioration of physical properties of a recycled aluminum ingot otherwise caused by the mixture of impurities and to improve the quality of a recycled aluminum ingot.

While one preferred embodiment of the invention has been described above, the present invention is not limited to these embodiments. It is to be understood that various changes and modifications may be made without departing from the scope of the invention defined in the claims.

What is claimed is:

1. A defective engine block processing method in a continuous casting line comprising inserting a bore in into an engine block mold, detecting whether or not an abnormality exists in the engine block mold or in molten aluminum used to cast an aluminum engine block body that will result in a defect in the aluminum engine block body, wherein when no abnormality is detected, the method comprises:

fitting a real liner to an outer circumferential surface of the bore pin; and injecting the molten aluminum into the engine block mold to cast the aluminum engine block body, the improvement comprising:

wherein when the abnormality is detected, the method comprises:

fitting an aluminum dummy liner to the outer circumferential surface of the bore pin, injecting the molten aluminum into the engine block mold to cast a defective engine block unit, and recycling the defective engine block unit without removing the aluminum dummy liner, wherein a diameter of the aluminum dummy liner increases along a length of the aluminum dummy liner.

2. The method of claim 1, wherein the aluminum dummy liner is formed by an extrusion process.

3. The method of claim 1, further comprising:

using a die casting machine to cast the defective engine block unit.

4. The method of claim 3, further comprising:

detecting, via a temperature sensor of the die casting machine, a temperature of the engine block mold; and triggering an alarm when the temperature of the engine block mold falls outside a predetermined temperature range.

\* \* \* \* \*